US008943661B2

(12) United States Patent
Krohmer et al.

(10) Patent No.: US 8,943,661 B2
(45) Date of Patent: Feb. 3, 2015

(54) NON-SLIP SPACER SUPPORT SYSTEM

(75) Inventors: Steve Donald Krohmer, Coon Rapids, MN (US); Daniel Patrick Banasik, Eagan, MN (US)

(73) Assignee: Rockler Companies, Inc., Medina, MN (US)

( * ) Notice: Subject to any disclaimer, the term of this patent is extended or adjusted under 35 U.S.C. 154(b) by 601 days.

(21) Appl. No.: 13/209,715

(22) Filed: Aug. 15, 2011

(65) Prior Publication Data

US 2012/0324697 A1 Dec. 27, 2012

Related U.S. Application Data

(60) Provisional application No. 61/501,539, filed on Jun. 27, 2011.

(51) Int. Cl.
*B23P 15/04* (2006.01)
*B25B 11/00* (2006.01)

(52) U.S. Cl.
CPC .................................... *B25B 11/00* (2013.01)
USPC .................................... 29/281.1; 269/289 R

(58) Field of Classification Search
USPC .............. 29/281.1, 244–282; 269/3, 6, 289 R
See application file for complete search history.

(56) References Cited

U.S. PATENT DOCUMENTS 639,941 A 12/1899 Rossi-Diehl
2,714,269 A 8/1955 Stafford
3,606,300 A 9/1971 Davis
3,822,499 A 7/1974 De Vos
D233,203 S 10/1974 Hughes
3,963,233 A 6/1976 Worden
4,175,736 A 11/1979 Dietlein
4,438,645 A 3/1984 Lutz
4,465,268 A 8/1984 Hudson
4,498,586 A 2/1985 Vitale
4,824,086 A 4/1989 Rickling et al.
5,000,713 A 3/1991 Cheng
5,077,050 A 12/1991 Wall
5,286,951 A 2/1994 Jones
5,419,534 A 5/1995 Vesely
D363,880 S 11/1995 Liebmann
5,509,601 A 4/1996 Drabick
5,531,625 A 7/1996 Zhong
D394,200 S 5/1998 Hartzheim
5,797,784 A 8/1998 Wolfe
5,918,867 A 7/1999 Goodyear
5,921,781 A 7/1999 Shaw
6,286,812 B1 9/2001 Cherry
D448,950 S 10/2001 McIveen
6,308,943 B1 10/2001 Fischer et al.
6,439,529 B1 8/2002 Wong (Continued)

OTHER PUBLICATIONS http://stots.com/stickyblocks.htm, Nov. 3, 2008,3pages.

*Primary Examiner* — Lee D Wilson
(74) *Attorney, Agent, or Firm* — James L. Young; Westman, Champlin & Koehler, P.A.

(57) ABSTRACT

A non-slip removable spacer for holding a workpiece in place relative to a work surface when interposed therebetween without permanent bonding therebetween. The spacer has a core with generally planar surfaces, with a pair elastomeric coverings applied to the surfaces. Further disclosed is a recessed attachment member in the spacer to receive a spindle element which permits spacers to be connected in a spaced part relationship. The spindle further includes a shelf.

20 Claims, 26 Drawing Sheets

(56) References Cited

U.S. PATENT DOCUMENTS

| | | | |
|---|---|---|---|
| D469,016 S | | 1/2003 | Gambino |
| D476,177 S | | 6/2003 | Hennessey |
| 6,702,273 B1 | | 3/2004 | Sellers |
| 6,803,552 B1 | | 10/2004 | Irizarry et al. |
| D504,805 S | | 5/2005 | Sorkin |
| 7,125,011 B2 | | 10/2006 | McLaughlin |
| D578,379 S | | 10/2008 | Sorkin |
| D581,251 S | | 11/2008 | Bucci |
| D581,254 S | | 11/2008 | Bucci |
| D602,341 S | | 10/2009 | Bucci |
| D603,245 S | | 11/2009 | Bucci |
| 7,654,510 B2 | | 2/2010 | Nishida |
| D613,149 S | | 4/2010 | Bucci |
| D613,582 S | | 4/2010 | Bucci |
| 8,317,176 B2 | | 11/2012 | Ferone |
| 8,336,868 B2 * | | 12/2012 | Wirth et al. ............... 269/289 R |
| 8,459,628 B2 | | 6/2013 | Adkins |
| 2003/0071406 A1 | | 4/2003 | Sellers |
| 2004/0150151 A1 | | 8/2004 | Diermeier et al. |
| 2006/0087067 A1 | | 4/2006 | Shamoon |
| 2009/0283035 A1 | | 11/2009 | Bucci |
| 2010/0212595 A1 | | 8/2010 | Campaneria, IV et al. |
| 2012/0068396 A1 * | | 3/2012 | Wirth et al. ............... 269/289 R |

* cited by examiner

NON-SLIP SPACER SUPPORT SYSTEM

CROSS REFERENCE TO RELATED APPLICATION

This application claims the benefit of U.S. Utility patent application Ser. No. 12/952,253 filed 23 Nov. 2010 and U.S. Provisional Application No. 61/501,539 filed 27 Jun. 2011, which hereby are incorporated herein by reference in their entirety.

BACKGROUND

When using woodworking hand tools on a bench, a worker will often employ one or more clamps or a flexible non-skid pad or mat in an attempt to hold the workpiece in place while manipulating the workpiece with the tool (e.g., sanding, routing, etc.). A clamp can interfere with access to a workpiece and care must be taken not to mar the workpiece with the clamp. While such pads or mats may serve to constrain the workpiece from moving relative to the bench or tool, the workpiece rests on the pad or mat surface and therefore access to the workpiece by the tool from the sides, lower edges and workpiece bottom is inhibited. Using a simple interposing block will result in slippage since more friction is needed. Using adhesives is possible but that would damage the workpiece. Soft materials are likely to shred because of the lateral shear force applied to the workpiece when worked by a tool (such as a sander or plane). A solution must provide a high degree of resistance, not mar the workpiece and be durable.

Furthermore, if one needs greater height than a single block for other reasons than raising the workpiece, it would be useful to have that option.

Finally, it would be useful to be able to create a workpiece support with the minimum contact area in order to apply finishes to the workpiece.

SUMMARY

A spacer system according to the present disclosure includes a spacer body having two planar, opposed major surfaces. The spacer body is configured for elevating a workpiece above a work surface to create a clearance between the workpiece and the work surface. Each of the two opposed major surfaces includes a continuous, non-slip layer. The opposed major surfaces of the spacer may be symmetrical or asymmetrical in shape (e.g., round, square, oval, rectangular, pie-piece shaped, etc.).

Another aspect of the disclosure is a non-slip removable spacer for holding a workpiece in place relative to a work surface when interposed therebetween. The spacer comprises a generally rigid core body having upper and lower generally planar surfaces and a peripheral edge to each of said surfaces; an elastomer layer applied to said upper and lower surfaces and spaced from said peripheral edge to expose a portion of the planar surface around the extent of the elastomer; said elastomer being unitary, resiliently compressible and having an exposed surface which is textured; and bonding between the surfaces and the elastomer layer so that the spacer is a sandwich of a hard generally planar core between the elastomer layers.

Another aspect of the disclosure is a method of constructing a non-slip spacer to prevent movement between a workpiece and a work surface without permanent affixation between the two. The method comprises steps of creating a core block with upper and lower generally planar surfaces; bonding a resilient, high friction elastomeric material to the upper and lower core surfaces; and limiting the coverage of the upper and lower surfaces by the elastomer so that a peripheral edge of the core surrounds the elastomer.

Another aspect of the disclosure is an attachable (or stand alone) cone piece which is used to elevate a workpiece but with a pointed end so that the contact surface between the cone and the workpiece is minimized. The cone is preferably an adapter to the non-slip spacer so that the two cooperate to create a non-slip surface and a minimum-contact point of contact on the workpiece.

Another aspect of the disclosure is a modification of the non-slip spacer to include a threaded receiver and the addition of riser sections which preferably include threaded bolts on both ends, so that they can be interconnected between two spacers or other threaded elements.

Another aspect of the disclosure is to use the above mentioned threaded receivers in the spacers to join spacers together by means of a double ended threaded bolt.

Another aspect of the disclosure is a non-slip body and spacer system for holding a workpiece in place relative to a work surface when interposed therebetween. The system has at least one spacer body having a generally rigid core body, the core body having upper and lower generally planar surfaces, a peripheral edge to each of said surfaces, and a gripping surface on the upper and lower surfaces. An improvement comprises a recessed portion generally centrally located in at least one of the planar surfaces; a female attachment element in said recessed portion; and a linking member having first and second spaced apart ends, each end including a male attachment element sized to be received in said female element, said linking member capable of connecting a pair of spacer bodies in parallel spaced apart planes.

Another aspect of the disclosure is a non-slip method of supporting a work piece spaced above a work surface, without attachment such as by clamps, fixtures, or fasteners, of the work piece to the work surface. The method comprises at least one or more of the following steps: interposing a first spacer element between the work surface and work piece, said spacer not being affixed to either the work surface or work piece; attaching a linking member having first and second ends to said spacer element generally orthogonally thereto, at one end, said spacer element being configured to securely attach to said linking member; attaching the second end of the linking member to a second spacer element generally orthogonal thereto, said spacer element being configured to securely attach to said linking member.

This summary is not intended to identify key features or essential features of the disclosed subject matter, is not intended to describe each disclosed embodiment or every implementation of the disclosed subject matter, and is not intended to be used as an aid in determining the scope of the disclosed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure is referred to by like reference numerals throughout the several views.

DETAILED DESCRIPTION

Figure 1:
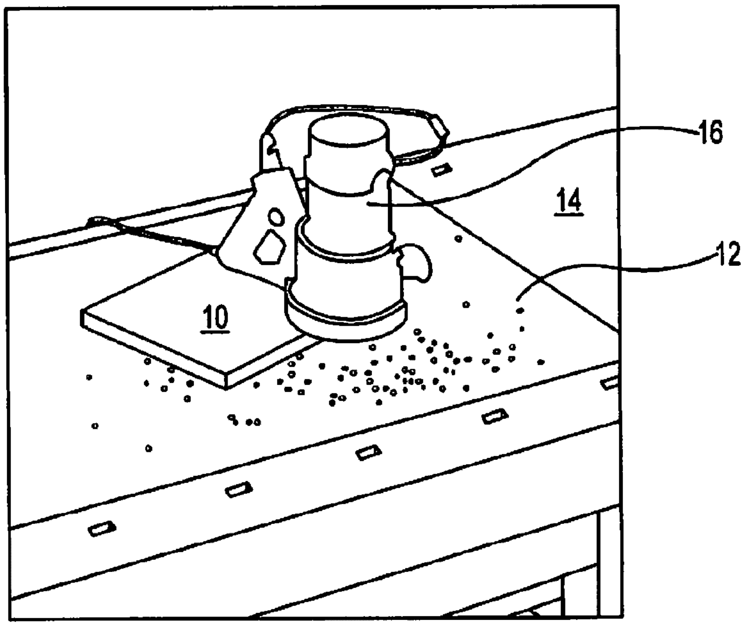
Fig. 1 (PRIOR ART)
FIG. 1 is a perspective view of a prior art non-slip mat positioned on a work bench surface, having a workpiece disposed thereon with a router being positioned on the workpiece.

A product, system and method are disclosed. As shown in FIG. 1, workpiece 10 rests on prior art non-slip mat 12, which in turn rests on work bench surface 14. Typically, such non-slip mats have a uniform thickness, ranging from 0.125 to 0.25 inch. A hand tool such as a router 16 has limited access to the side edges and bottom surfaces of workpiece 10 in the illustrated arrangement, since the workpiece 10 is spaced from the work bench surface 14 only by the thickness of the non-slip mat 12, and the mat 12 may extend out from the sides of the workpiece 10. The work piece rests directly on the worksurface. This has many disadvantages in terms of accessing the side and bottom of the work piece as well as potential damage thereto. The solution of the present disclosure is directed to a spacer system which allows the workpiece to be elevated from the work surface (or other support) and prevented from sliding without permanent attachment to the work surface and without clamping (which may be impossible or damaging to the work piece). This non-permanent attachment means that the work piece can be removed from the work surface without disengaging of any mechanical fasteners (screws, clamps, bolts, etc.) yet it is effective at preventing lateral slippage along the work surface in response to action of tools.

Figure 2:
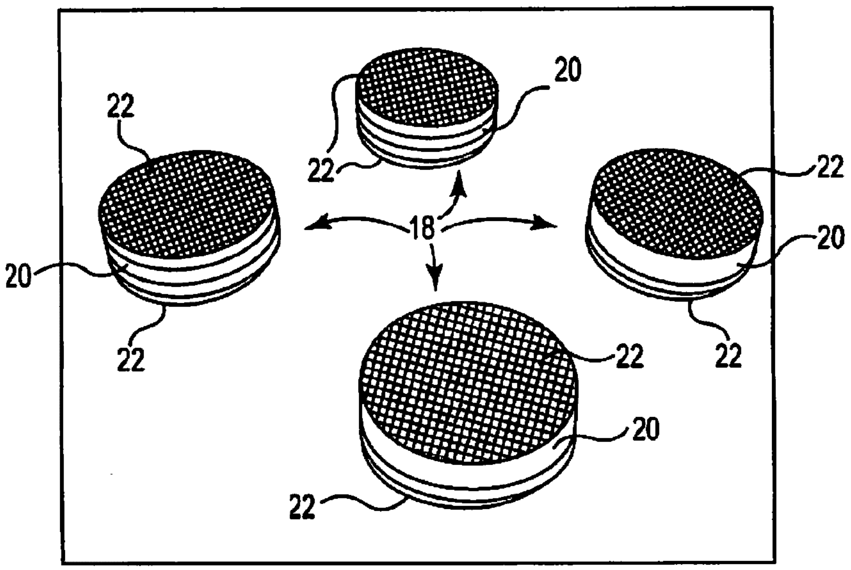
FIG. 2 is a perspective view of a plurality of exemplary non-slip spacers of the present disclosure.

The present disclosure is directed to a non-skid/slip spacer arrangement and methods for its use. In an exemplary embodiment such as shown in FIG. 2, each of a plurality of spacers 18 comprises a spacer body 20 sandwiched between non-slip layers 22.

In an exemplary embodiment, spacer body 20 is made of a hard, incompressible and durable material such as wood or plastic. In some illustrated embodiments, each spacer body 20 is configured as a disc so its opposed major surfaces are circular, though other shapes for spacer major surfaces may also be used, as further discussed below.

In one exemplary embodiment, non-slip layer 22 is disposed on each of the two major surfaces of the spacer body 20. Non-slip layer 22 may be composed of a durable, yet compressible, material such as rubber, silicone, a thermoplastic elastomer, or the like, with a nominal generally uniform thickness of 0.14 inch. An acceptable range for the non-slip layer thickness is 0.0625 to 0.50 inch. In one embodiment, the side of the non-slip layer 22 opposite the side that is attached to spacer body 20 is textured (see, e.g., FIG. 2, 6 or 12-14). Non-slip layers 22 may be attached to each of the two opposed major surfaces of spacer body 20 by an adhesive, though other attachment means and mechanisms can be used.

Figure 3:
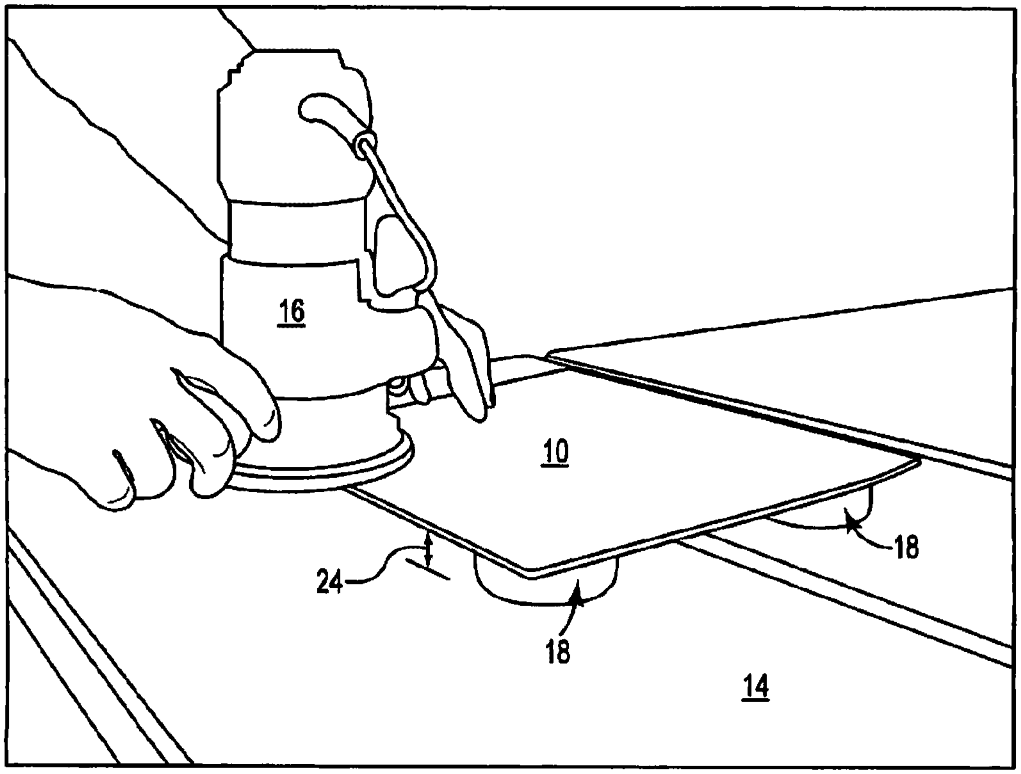
FIG. 3 is a perspective view of a plurality of spacers according to FIG. 2, positioned on a work bench surface, having a workpiece laid thereupon, with the workpiece being worked upon by a router.
Figure 7:
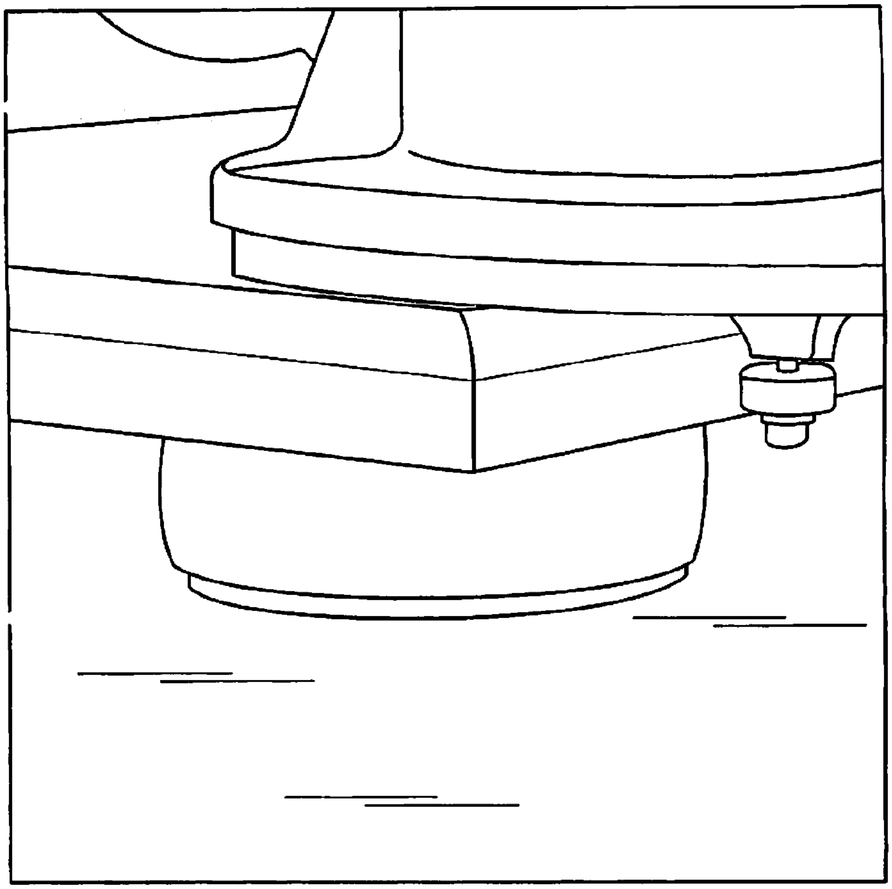
FIG. 7 is an enlarged perspective view of one of the spacers according to FIG. 3.

FIG. 3 is a perspective view of a workpiece 10 resting upon a plurality of non-slip spacers 18, which in turn rest upon work bench surface 14. The thickness of non-slip spacers 18 elevates workpiece 10 by a clearance distance 24 above work bench surface 14. Thus, the user of a hand-held woodworking tool such as router 16 is able to access the side and bottom edges of workpiece 10 without contacting the work bench surface 14 with the router 16. This is useful, for instance, when the depth of a tool (e.g., a router bit) is greater than the thickness of the workpiece, such as illustrated in FIG. 7.

Figure 4:
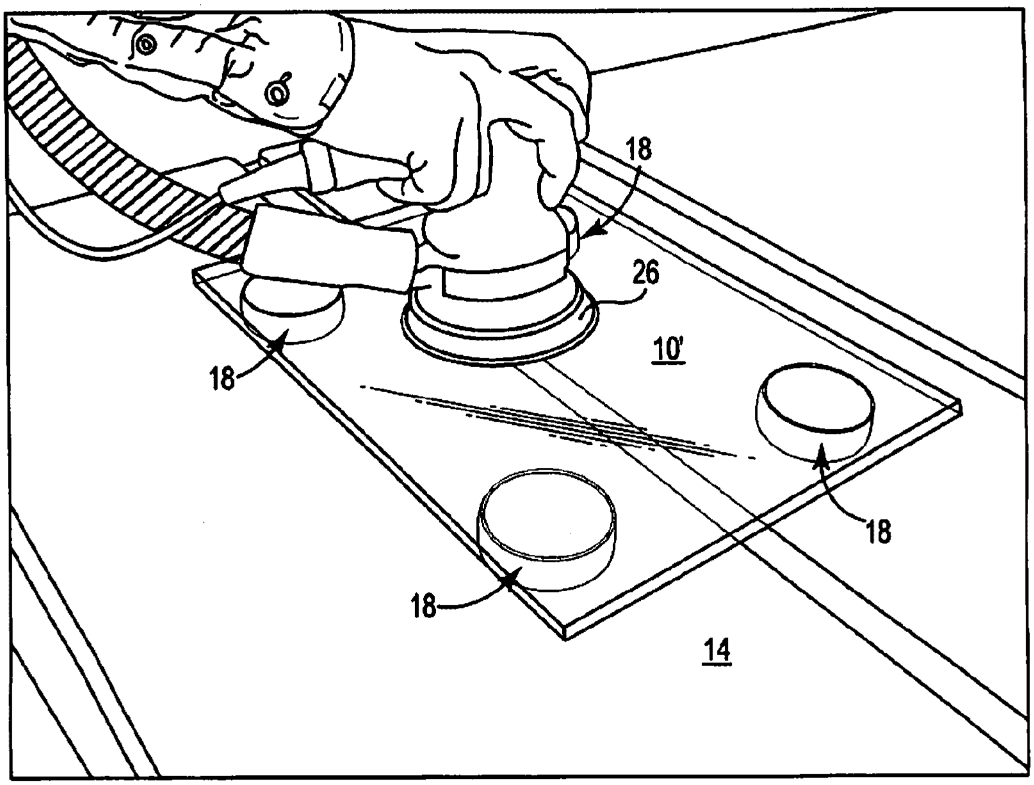
FIG. 4 is a perspective view of a plurality of spacers according to FIG. 2, positioned on a work bench surface, having a transparent workpiece laid thereupon (so that the non-slip spacers may be more easily seen), with the workpiece being worked on by a rotary surface finishing tool.

FIG. 4 is a view similar to FIG. 3, but showing transparent workpiece 10' and a different woodworking hand tool 26, such as a sander, buffer or polisher. A plurality of non-slip spacers 18 is arranged under workpiece 10' to support workpiece 10' as it is worked upon by hand tool 26. While four non-slip spacers 18 are shown in these illustrations, it is to be understood that more or fewer may be used, depending on the size and shape of the workpiece 10, 10'. In an exemplary method of use, each non-slip spacer 18 is positioned entirely between workpiece 10, 10' and work bench surface 14. However, such placement is not necessary and non-slip spacers 18 will adequately support workpiece 10, 10' even if a portion of a non-slip spacer 18 projects beyond workpiece 10, 10' (see, e.g., FIGS. 5, 8, 9 and 11).

The use of a plurality of non-slip spacers 18 allows for flexibility in the arrangement of non-slip spacers 18 relative to work bench surface 14 and workpiece 10, 10'. For example, more or fewer non-slip spacers 18 may be used under a particular workpiece 10, 10'. Moreover, the plurality of non-slip spacers 18 may be disposed in an arrangement that is symmetrical or asymmetrical with respect to workpiece 10, 10' and/or the spacers 18 themselves, depending upon the particular application. Moreover, individual non-slip spacers 18 may be easily repositioned as needed while the worker works upon the workpiece 10, 10'.

Figure 5:
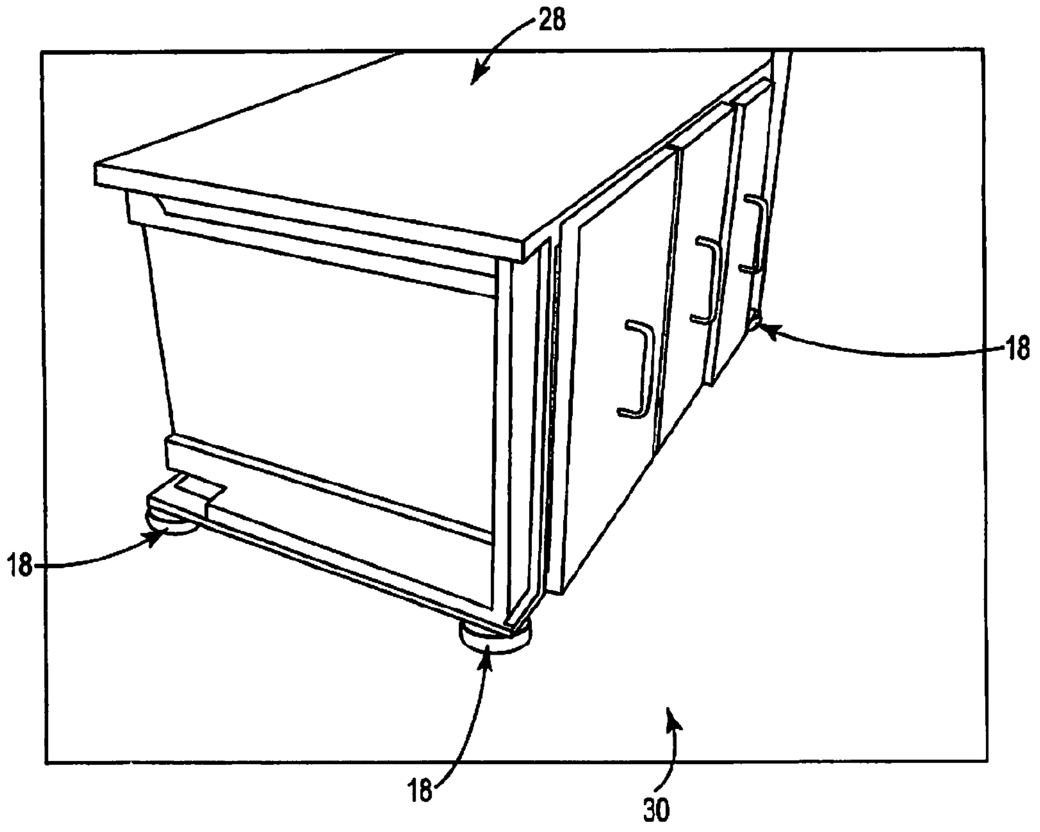
FIG. 5 is a perspective view of a plurality of non-slip spacers of the present disclosure elevating a surface of a large workpiece above a floor surface.
Figure 6:
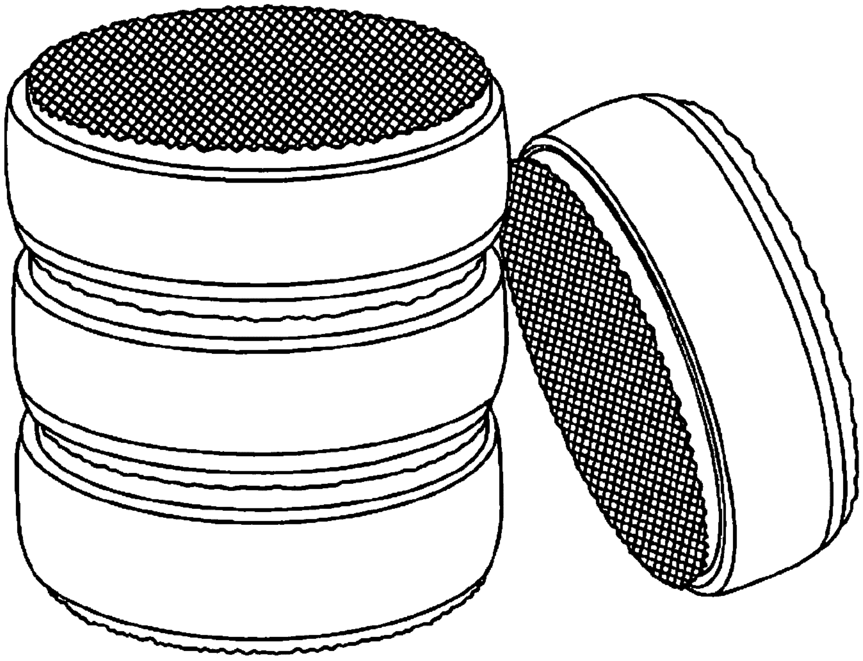
FIG. 6 illustrates a plurality of exemplary non-slip spacers of the present disclosure.
Figure 11:
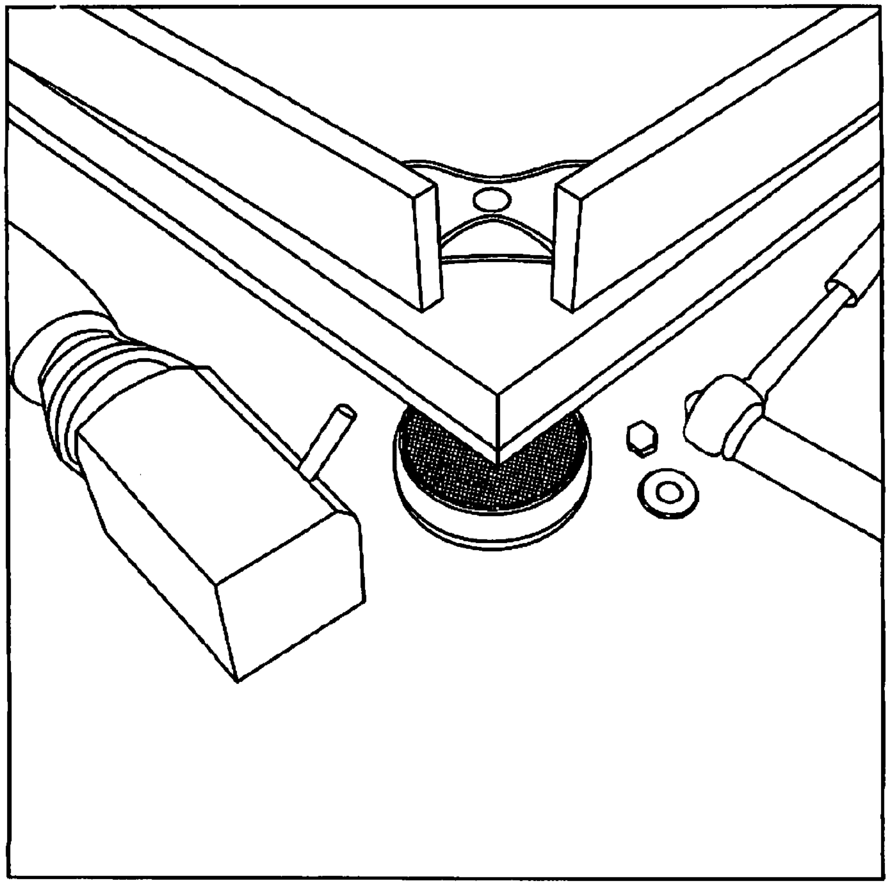
FIG. 11 is a perspective view of a workpiece positioned on a work bench, supported by a plurality of spacers according to FIG. 6 (only one of which is shown), with the workpiece being an upside down table top positioned for assembly of one of its legs thereto.
Figure 12:
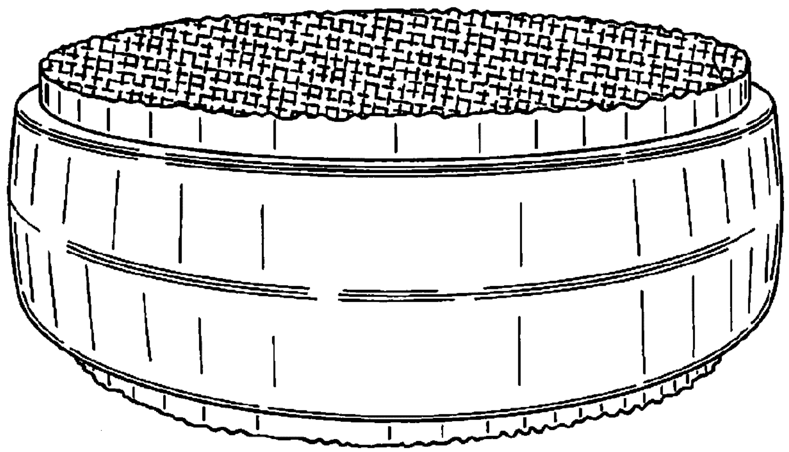
FIG. 12 is a perspective view of one of the spacers according to FIG. 6.
Figure 13:
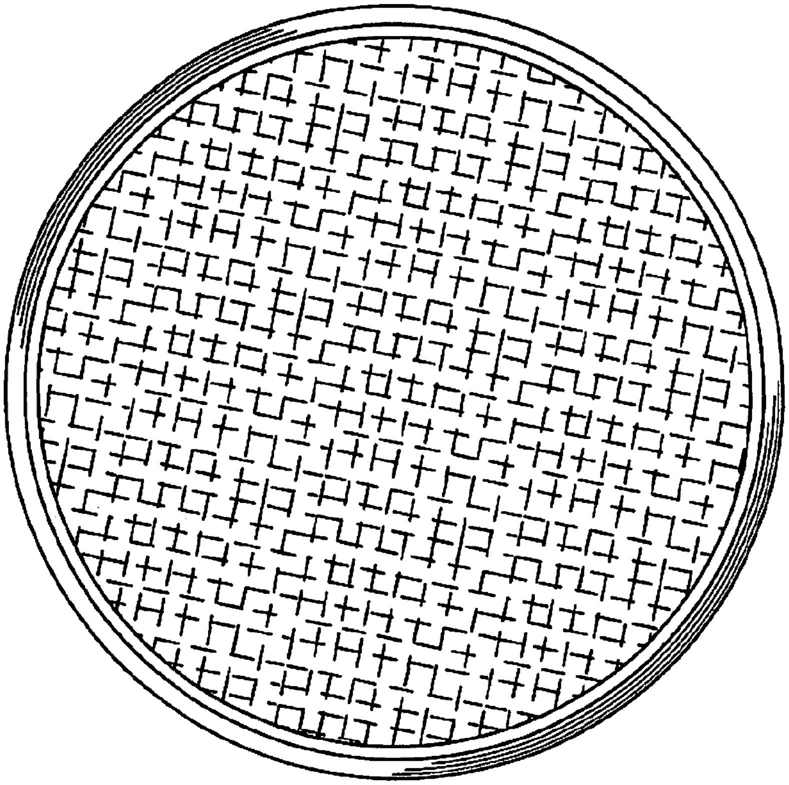
FIG. 13 is a top plan view of one of the spacers according to FIG. 6 (the bottom plan view is a mirror image of the top plan view).
Figure 14:
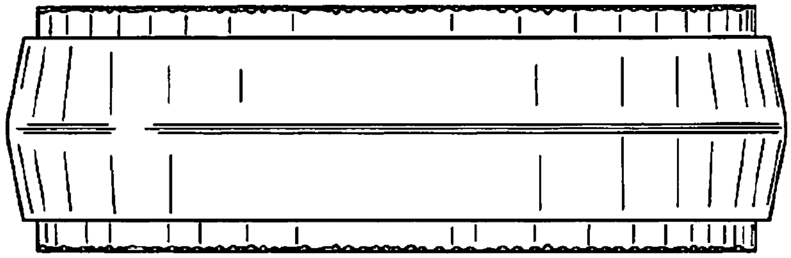
FIG. 14 is a side elevation view of one of the spacers of FIG. 6 (the view from the side is the same on all sides thereof).

FIG. 5 shows an alternative method of use of non-slip spacers 18, in which they are positioned beneath a large workpiece 28 to elevate workpiece 28 above a floor surface 30. The spacers are also useful for protecting a surface from being marred by contact with a floor or rough workpiece surface, as illustrated in FIG. 5 and FIG. 11 (for example, FIG. 11 illustrates a finished table top surface spaced from a rough workpiece surface by spacers).

Figure 15:
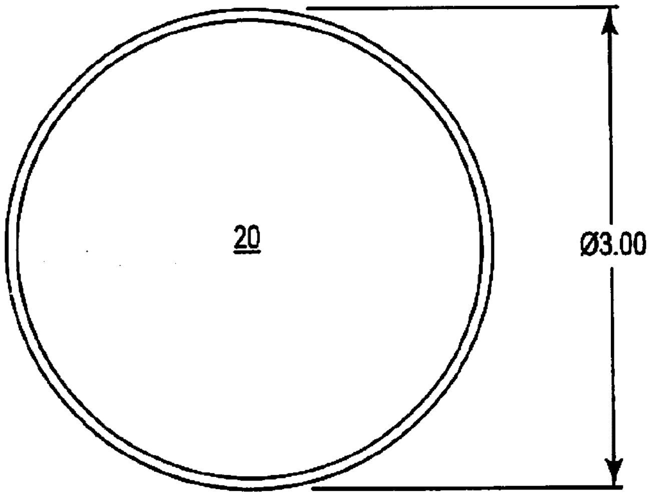
FIG. 15 is a top plan view of an exemplary spacer body for a spacer according to FIG. 6, showing an exemplary diameter.
Figure 16:
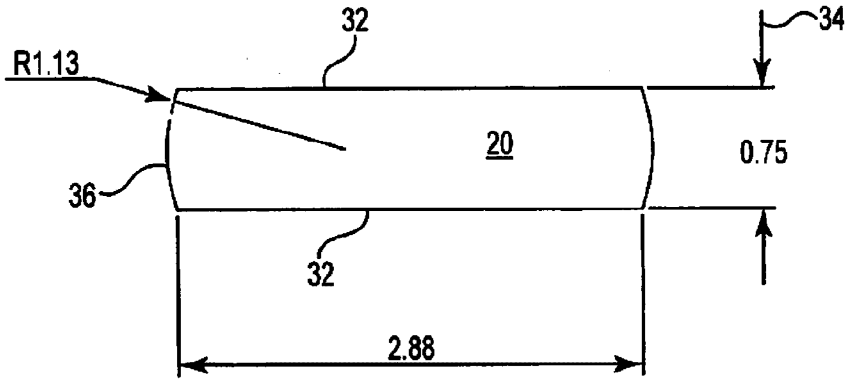
FIG. 16 is a side elevation view of an exemplary spacer body for a spacer according to FIG. 6, showing exemplary dimensions.
Figure 17:
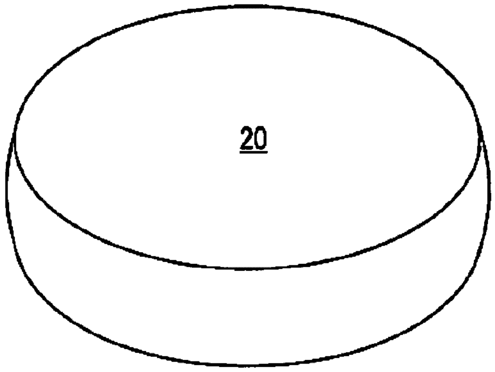
FIG. 17 is a perspective view of an exemplary spacer body for a spacer according to FIG. 6.

FIGS. 15, 16 and 17, respectively, are top, side elevation and perspective views of an exemplary spacer body 20. As shown in FIG. 15, such a spacer body 20 has a round major surface with a diameter of about 3 inches. As shown in FIG. 16, spacer body 20 has a diameter at each major surface 32 of about 2.88 inches. In an exemplary embodiment, spacer body 20 has a thickness 34 of 0.75 inch. In the illustrated embodiment, outer radial wall 36 has a radius of curvature of about 1.13 inch. Based on the numbers provided above, the elastomer thickness is preferably about 5.7%, 18% or 37.5% of the core thickness.

Figure 18:
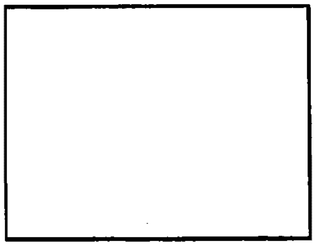
FIGS. 18-28 illustrate additional exemplary major surface shapes for a spacer (or, in the case of FIGS. 19 and 20, for coordinated groups of spacers) of the present disclosure.
Figure 19:
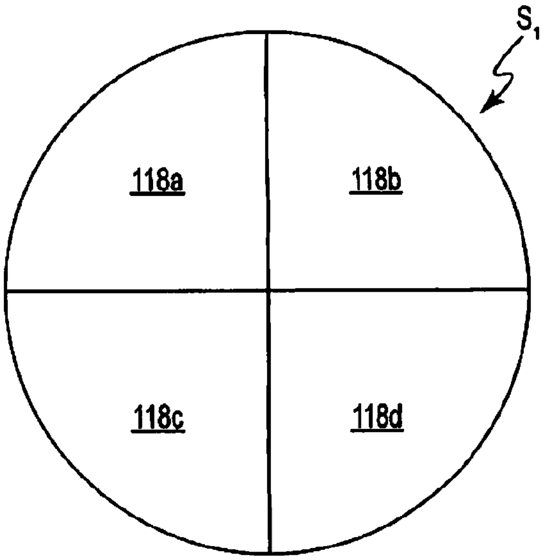
Figure 20:
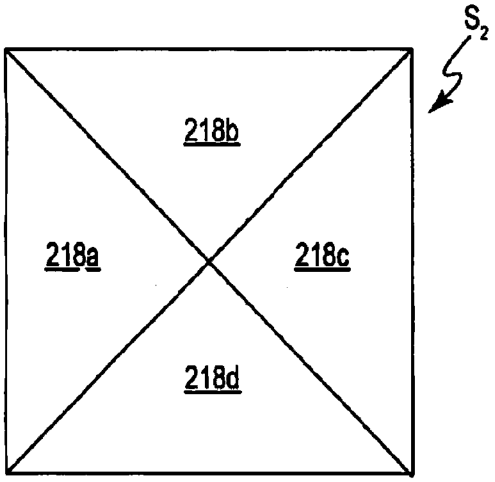
Figure 21:
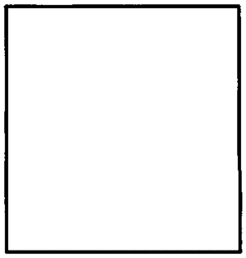
Figure 22:
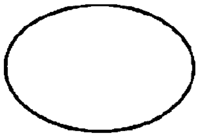
Figure 23:
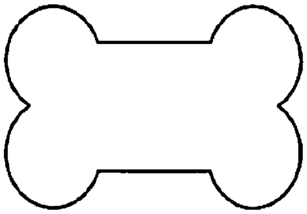
Figure 24:
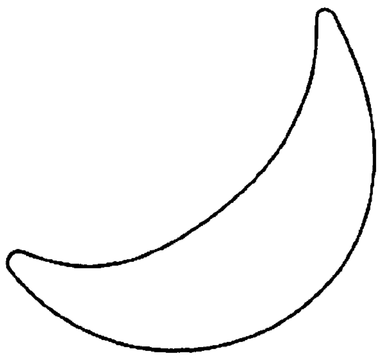
Figure 25:
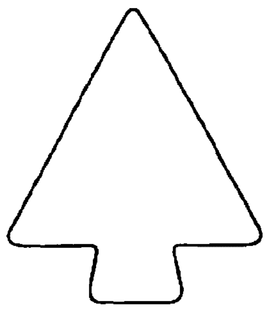
Figure 26:
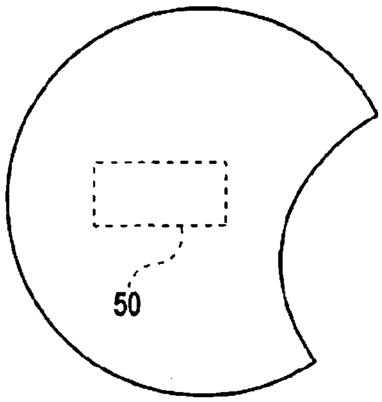
Figure 27:
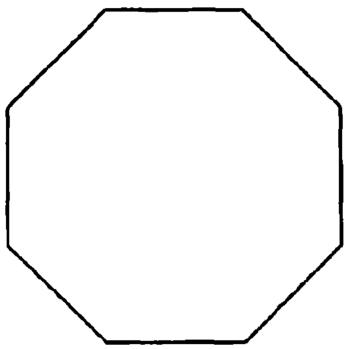
Figure 28:
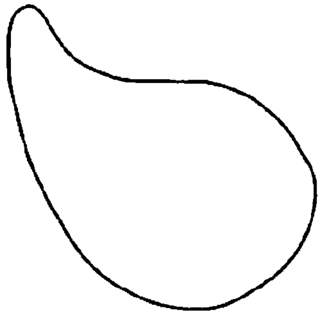

As noted above, the major surfaces of a spacer can have a variety of shapes. FIGS. 18-28 are merely some examples of the alternative shapes that can be used for the major surfaces of the non-slip spacers of the present disclosure. FIG. 18 illustrates an exemplary rectangular shape. FIG. 19 illustrates four spacers **118*a*, 118*b*, 118*c* and 118*d*, each of which has major surfaces thereon shaped as a quarter of a circle (i.e., a pie-piece shape). The four quarters 118*a*, 118*b*, 118*c* and 118*d* can be joined to form a combined large circular horizontal spacer assembly S1. Another example of this type of horizontal spacer assembly is illustrated in FIG. 20. FIG. 20 shows spacers 218*a*, 218*b*, 218*c* and 218*d*, each with isosceles triangular major surface shapes. The spacers 218*a*, 218*b*, 218*c* and 218*d* can be joined into a spacer assembly S2 which is rectilinear (in the illustrated example, square). FIG. 21 illustrates a single spacer major surface formed in a square shape. FIG. 22 illustrates a spacer major surface having an oval shape. FIG. 23 illustrates a spacer major surface having a dog bone shape. FIG. 24 illustrates a spacer major surface having a moon sliver shape. FIG. 25 illustrates a spacer major surface having a Christmas tree shape. FIG. 26 illustrates a round "cookie" shaped major surface shape with a bite out of it. FIG. 27 illustrates an octagon shaped major surface for a spacer. FIG. 28** illustrates a tear or paisley shaped major surface for a spacer. Again, the major surface shapes illustrated herein are exemplary.

In some applications, it may be desirable to have a spacer which is longer in one dimension than in another (such as illustrated, for example, by the spacer shapes of FIGS. 18, 22, 23, 24, 25 and 28). This may provide additional stability and/or gripping surface and force along the elongated dimension of the spacer.

A rare earth magnet, such as illustrated by magnet 50 in FIG. 26, may be adhered to, embedded in or encased within a spacer. This magnet would then have a strong enough magnetic attraction along at least one major surface of that spacer to allow the spacer to be attached to a ferrous vertical surface, such as the side of a steel tool cabinet, steel work bench leg, or the like. This feature facilitates ease of storage and accessibility for the spacer of the present disclosure.

In some instances, it may be also be useful to stack spacers to further space a workpiece from a work surface. For example, eight spacers could be used to form four vertical spacer assemblies for use in spacing a workpiece from a work surface, with each vertical spacer assembly composed of two spacers stacked together (in the manner of the stacked spacers illustrated in FIG. 6).

Figure 8:
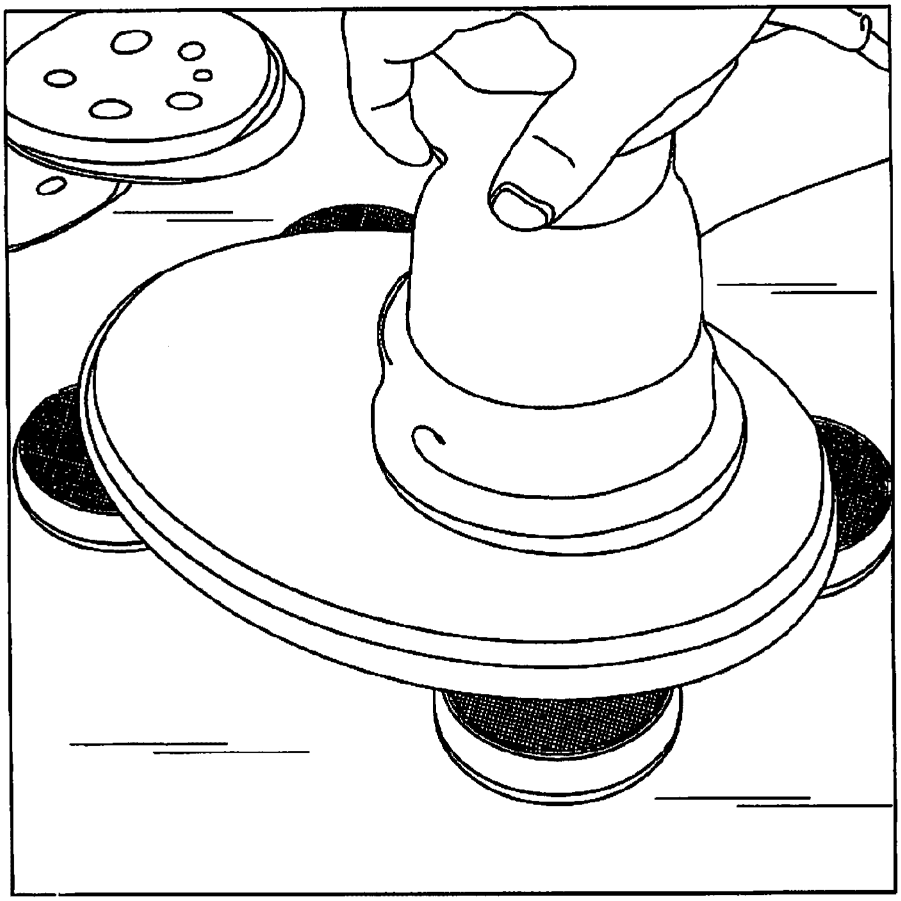
FIG. 8 is a perspective view of a plurality of spacers according to FIG. 6, positioned on a work bench surface, having a workpiece laid thereon, with the workpiece being worked upon by a rotary sander.
Figure 9:
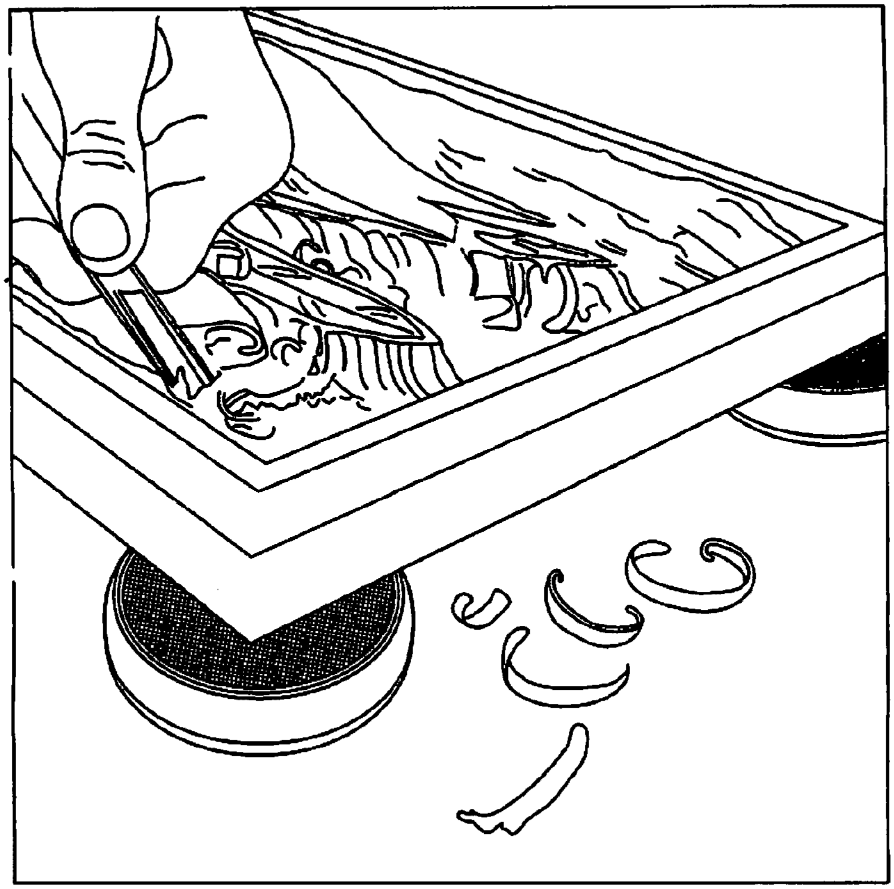
FIG. 9 is a perspective view of a plurality of spacers according to FIG. 6, positioned on a work bench surface, having a workpiece laid thereon, with an upper surface of the workpiece being engaged by a manual carving tool.
Figure 10:
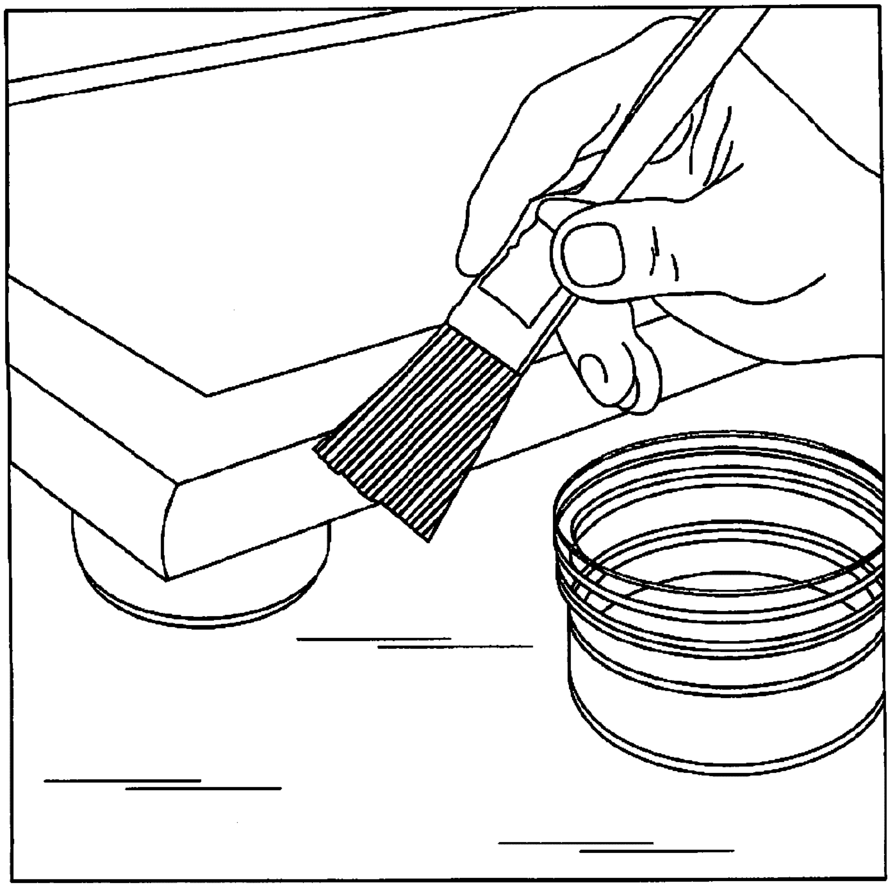
FIG. 10 is a perspective view of a workpiece positioned on a work bench, supported by a plurality of spacers according to FIG. 6 (only one of which is shown), with a coating of surface treatment material (e.g., wood stain) being applied manually to the workpiece.

As illustrated in FIGS. 7 and 8, the work bench environment is not always a clean one—there may be debris or dust or sawdust there. However, the non-slip spacer of the present disclosure still provides a relatively non-slip surface even if there is a layer of sawdust between the spacer and the work bench, or between the spacer and the workpiece. It is believed that this attribute is facilitated by the fact that the non-slip layers 22 are compressible and textured.

It is also believed that providing a peripheral edge around the elastomer and providing a smooth or sharp and continuous straight edge on the elastomer, as shown in the drawings, is the preferred embodiment. The elastomer is preferably limited in its extent not overlying the entire core surface. This protects the elastomer from shearing when the lateral forces of the workpiece vs workbench/surfaces are applied. The elastomer will be driven toward the core but if it were to stretch beyond the core, it might shear away and disintegrate. Because the peripheral edge supplies support for the stretched elastomer, it stays intact Further, if the edge of the elastomer forms a continuous unbroken straight edge, such as forming a straight line edge or sidewall, there is greater cohesion and the elastomer is less likely to 'break up" into pieces. Such pieces then become a roller bearing surface which would reduce the gripping force.

The elastomer shown is unitary, i.e., made of a single material, not an elastomer with a web overlay. Such alternative will provide lower frictional engagement.

The non-slip spacer of the present disclosure lifts, grips and protects the workpiece while it is being worked on. Each major surface of the non-slip spacer of the present disclosure has a high-friction resilient surface. Each spacer also has a durable core. The spacers constrain workpieces from slipping while routing, sanding, carving and the like. The spacers raise up panels for edge work and finishing, and make assembly easier. Set up of the spacers on a work bench can be done quickly, and the spacers are quite versatile in terms of both horizontal and vertical configurations. Using the spacers of the present invention provides the ability to route, sand, cut and carve a workpiece without using clamps, allows a workpiece to be raised up for easy edge finishing, allows the support of a workpiece without leaving marks on the workpiece, allows the assembly of a workpiece or project on a stable, non-slip base, and allows for a quick setup for any application.

Figure 29:
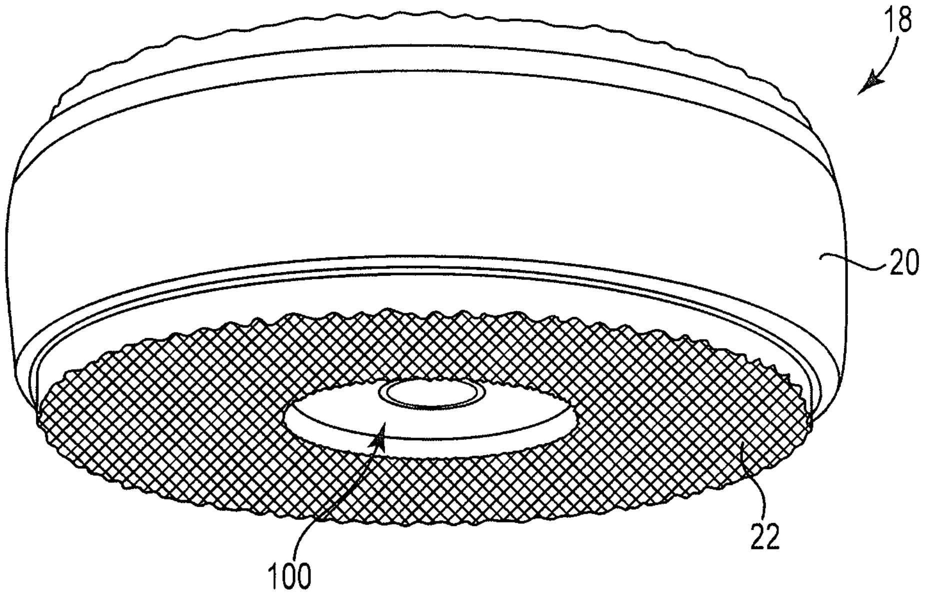
FIG. 29 illustrates a modified spacer with a central threaded receiver.
Figure 30:
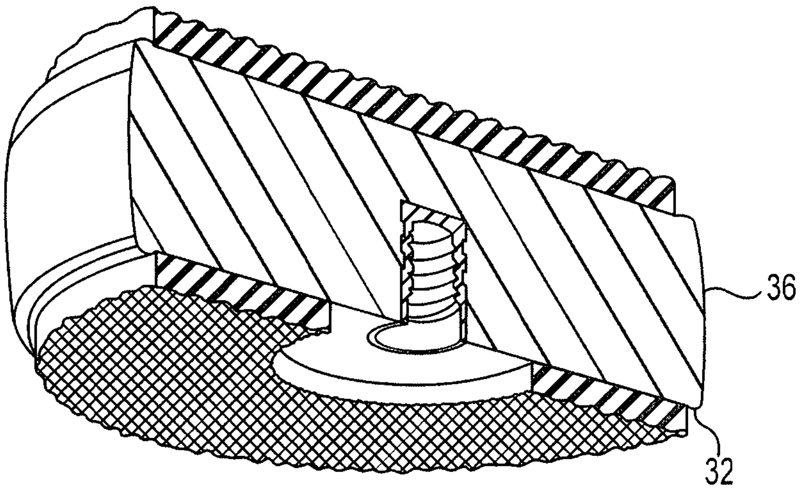
FIG. 30 is a view of FIG. 29 with portions cut away.

FIGS. 29-30 illustrate a further embodiment of the spacer 20. In this embodiment, the spacer includes a recessed attachment point 100 which includes a threaded portion 102. The recess can be referred to as “female” in that it does not protrude above the surface (which could scratch the work piece). FIG. 30 shows the attachment point on one side, but a preferred embodiment can have attachment points on both sides. It is desirable that the attachment point be at or below the surface 22. The attachment point need not be threaded and other attachment means are contemplated by this disclosure including but not limited to snap fit, friction fit, hook and loop attachment or similar.

The purpose of the attachment point is to create additional ways to use spacers 18. FIGS. 33-38 illustrate a number of possibilities, but it is not an exclusive list.

Figure 31:
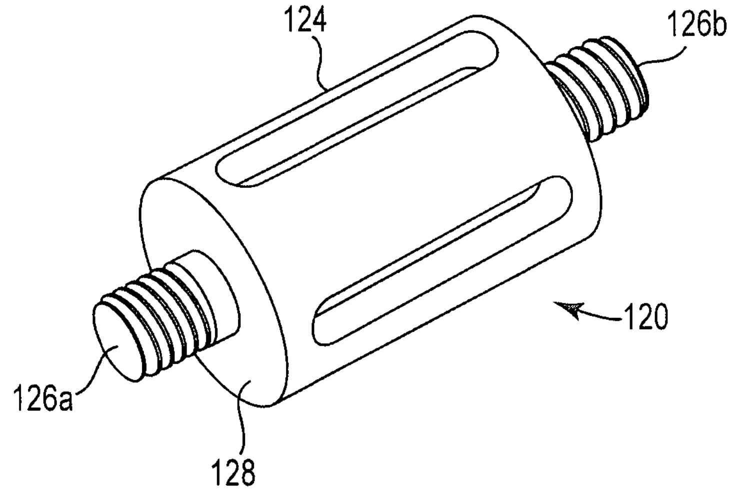
FIG. 31 illustrates a perspective view of an embodiment of a double ended threaded spacer element.
Figure 32:
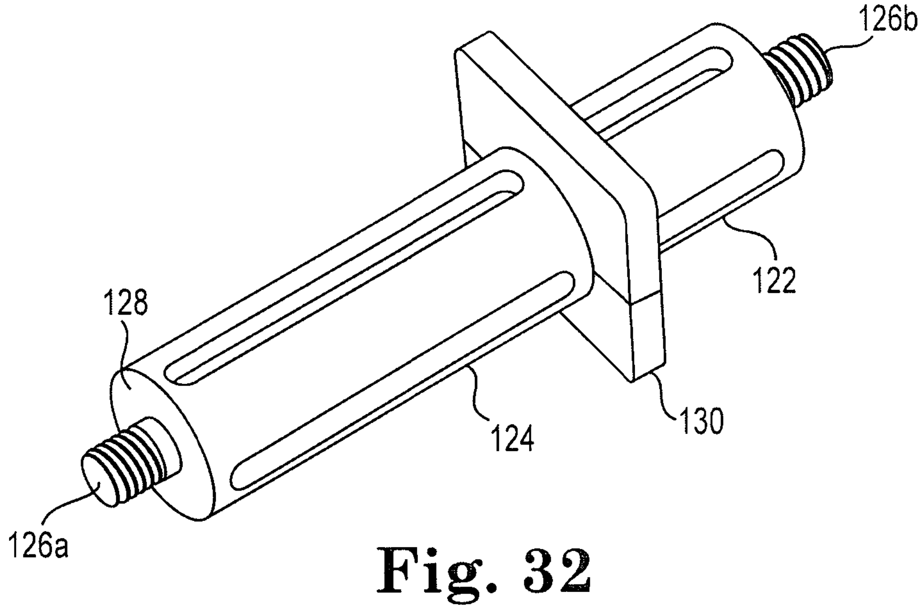
FIG. 32 illustrates a perspective view of another embodiment of a double ended threaded spacer element.
Figure 33:
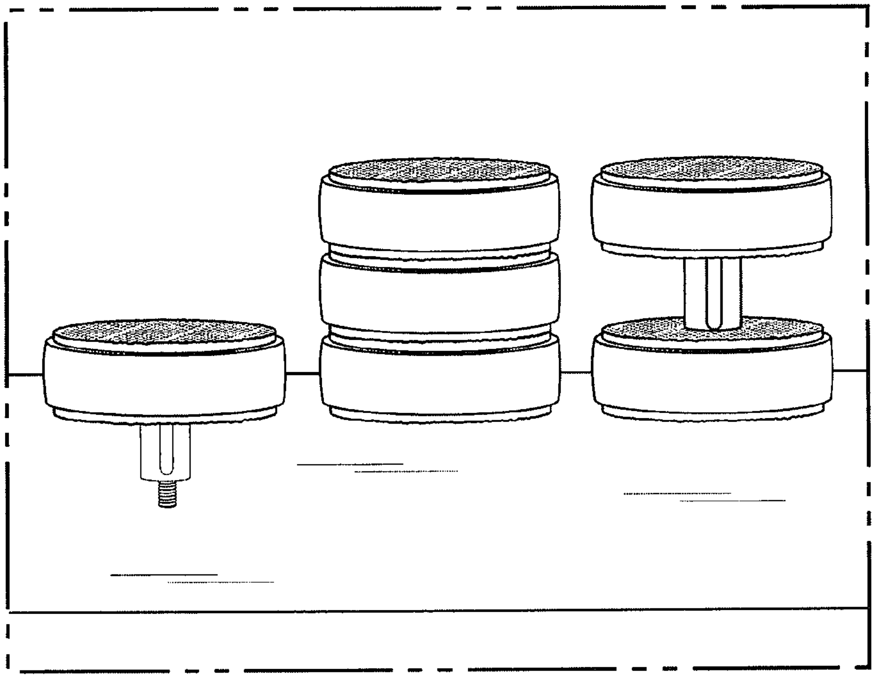
FIG. 33 illustrates a perspective view of several embodiments showing attachment options for non-slip spacer elements.
Figure 34:
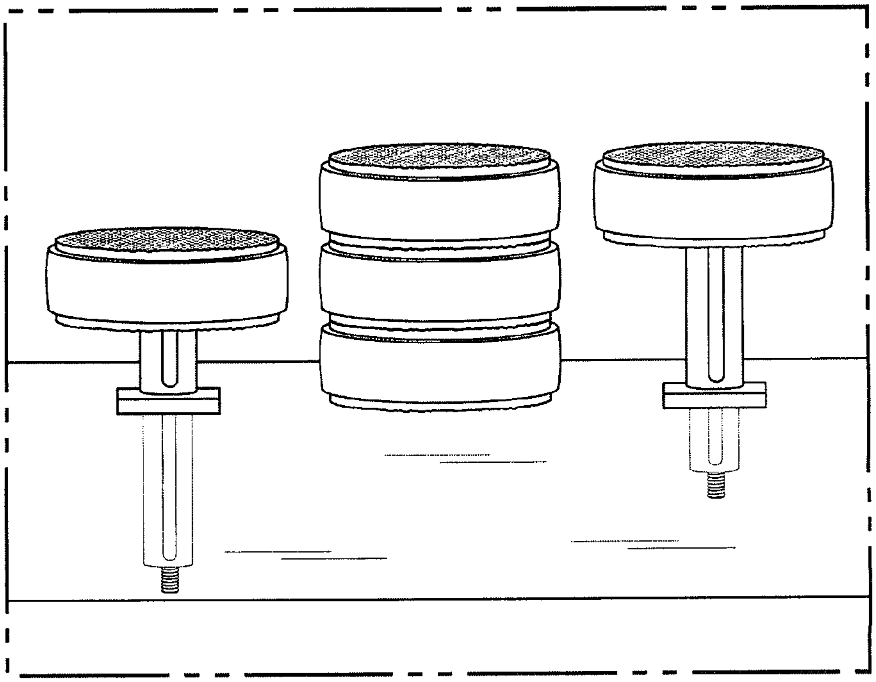
FIG. 34 illustrates a perspective view of several additional embodiments showing attachment options for non-slip spacer elements.

FIGS. 31-32 illustrate exemplary spindles 120 and 122 which are elongated longitudinal members having a body 124 and a pair of threaded ends 126*a*-126*b*. These protrusions can be male fasteners, but in any event they need to securely engage with like recesses (female) to create a solid connection. In the preferred embodiment, the threaded ends are threaded with respect to each other, so that they are universally usable in all threaded recesses on spacers 18. Alternatives to threaded members are protrusions which snap fit or friction fit engage the recesses and other types of attachment systems which mate with like systems on the spacers. The spindles 120-122 are intended to provide a fixed space between spacers 18 as shown in FIG. 33. The body length of the spindle can be zero (i.e., only end to end portions 126*a/b* as would be contemplated in the middle stack of spacers in FIG. 33). This zero length spindle allows for an unlimited stack of spacers 18 without risk of separation and toppling. The body of spindle 128 may be sized to be received within an aperture such as in a workpiece, bench, table or saw horse as will be explained below.

Of course, it is then possible to join/stack spacers and spindles alternately to achieve very high stacks. Spindle 122 further includes a shelf portion 130 which is interposed between the spindle ends. Shelf 130 is a portion which extends generally orthogonally to the spindle axis which runs through the attachment points 126. This shelf or flange allows the spindle to be used in predefined apertures typically holes in a work bench, the workpiece itself or other structure such as a saw horse. The shelf or flange acts as a stop such as shown in FIGS. 34-38. In the preferred embodiment, the shelf is located toward one end of the spindle, i.e., not centered, so that the height of the spacer can be varied by using the spindle upsidedown such as shown in FIG. 36. It is also possible to have two stops on the spindle at different locations along the length for the same purpose.

It is also possible to have a plurality of shelves spaced along the spindle and the shelves can be broken off to get more or less the correct desired height. It is also possible to have the stop be moveable by providing a shelf as a flange with a set screw but slideable along the length of the spindle before locking by set.

Figure 38:
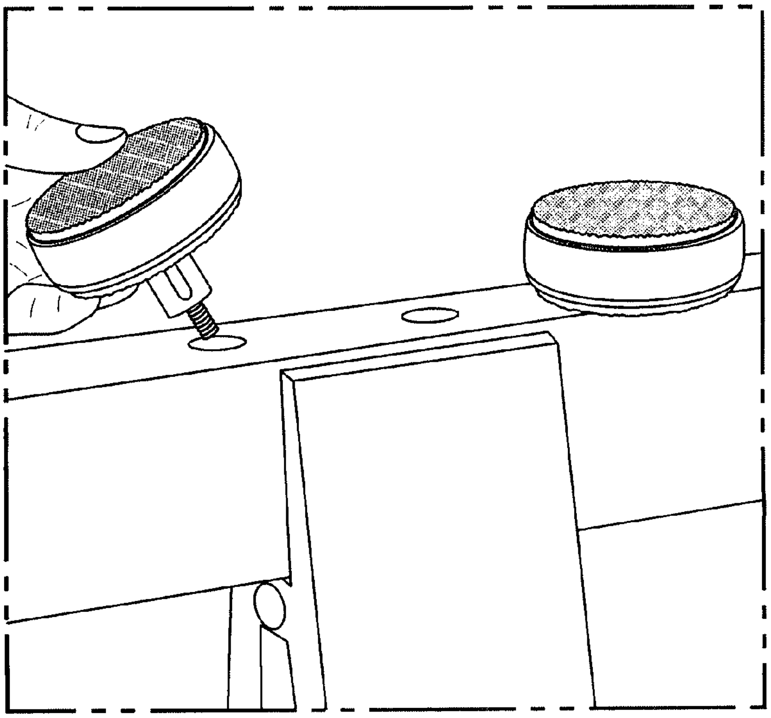
FIG. 38 illustrates a perspective view of several additional embodiments showing attachment options for non-slip spacer elements.
Figure 39:
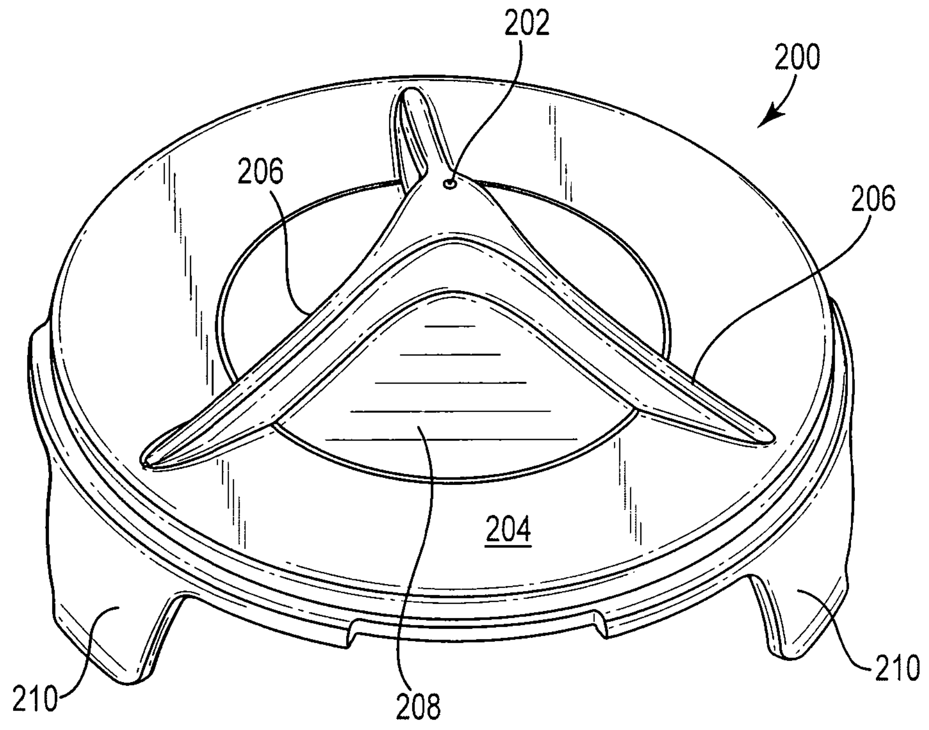
FIG. 39 is a perspective view of a cone.
Figure 40:
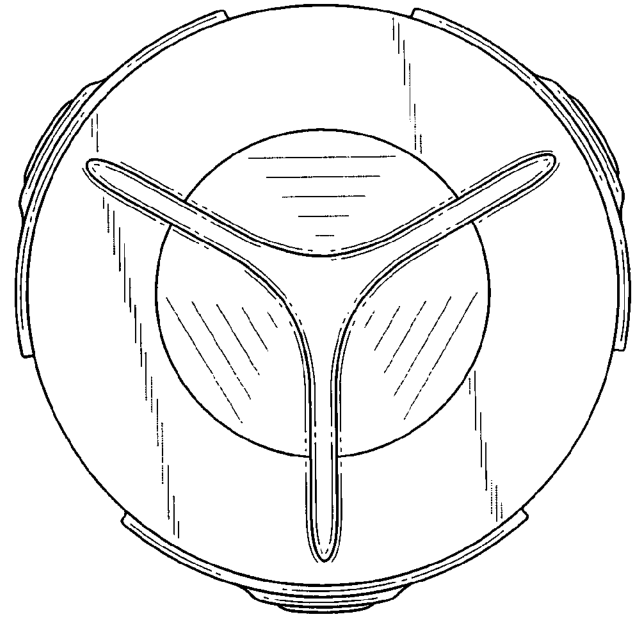
FIG. 40 is a top plan view of the cone of FIG. 39.

The spindle also provides stability as shown in FIG. 38, where no shelf is used but the body 128 is received within a hole in a saw horse and thus the spacer 18 is secure against falling off.

Figure 35:
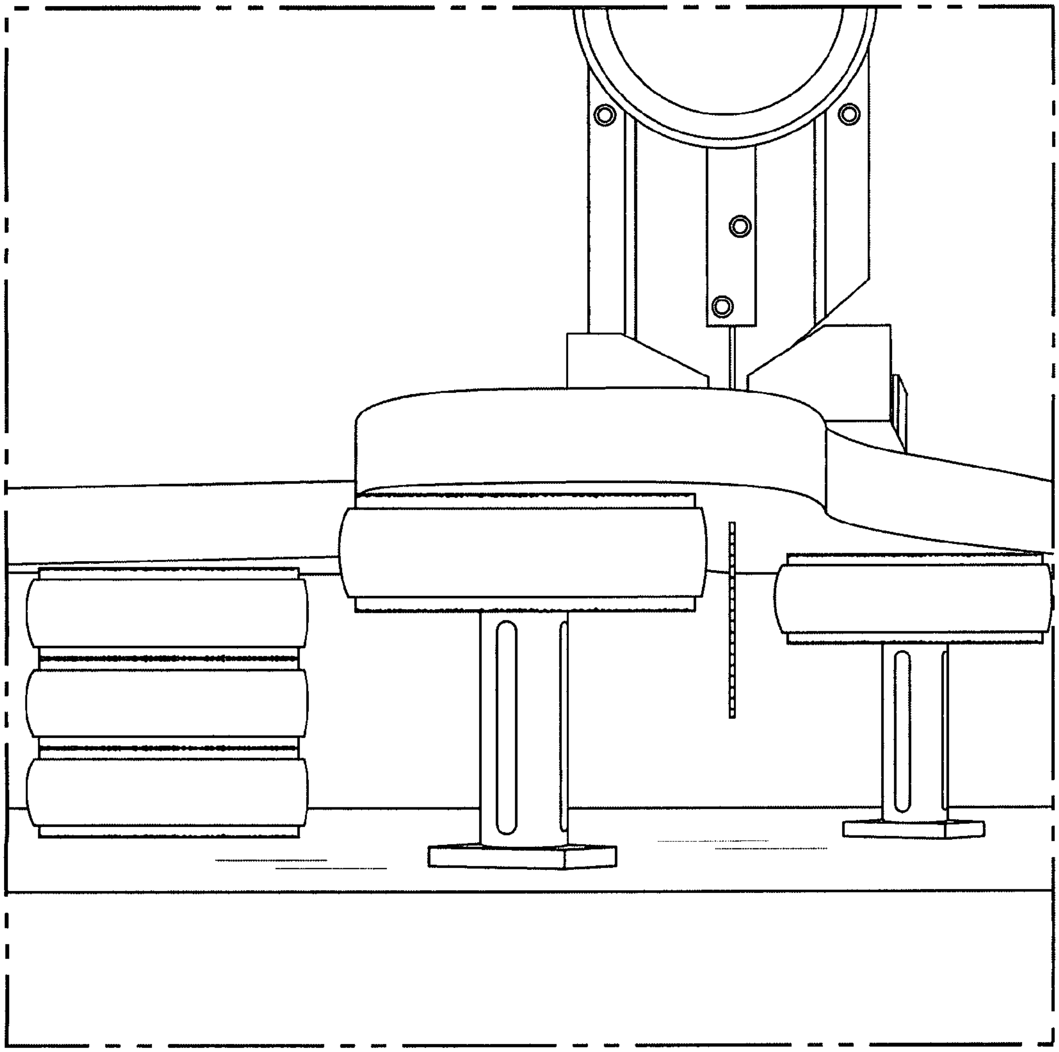
FIG. 35 illustrates a perspective view of several additional embodiments showing attachment options for non-slip spacer elements.
Figure 36:
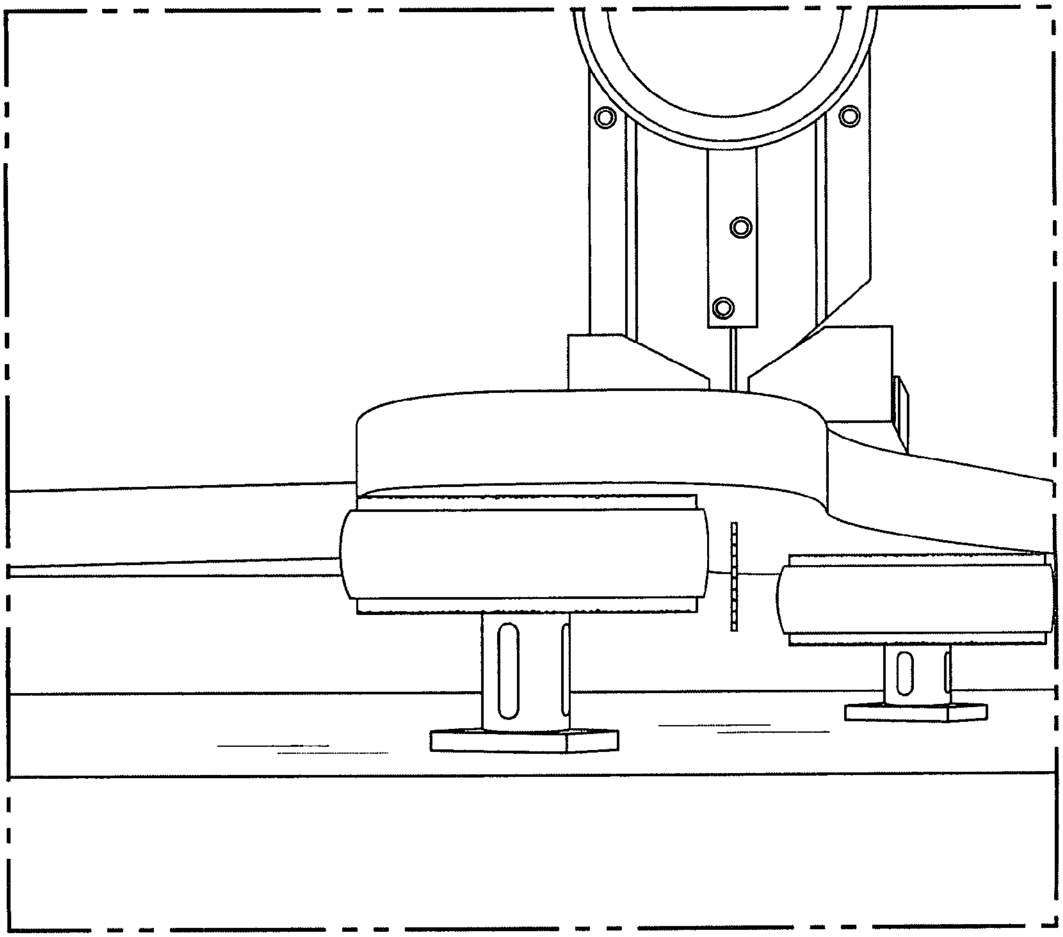
FIG. 36 illustrates a perspective view of several additional embodiments showing attachment options for non-slip spacer elements.
Figure 37:
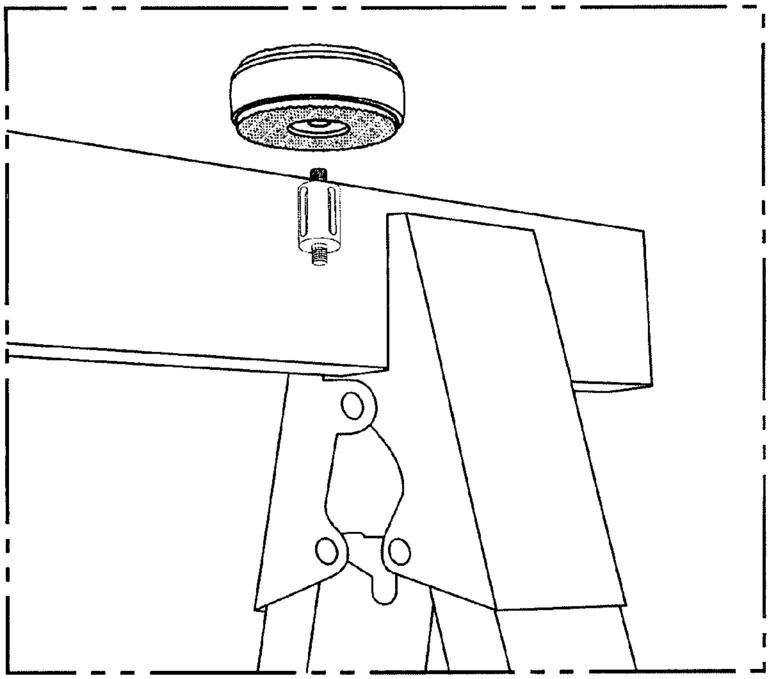
FIG. 37 illustrates a perspective view of several additional embodiments showing attachment options for non-slip spacer elements on a saw horse.

For workpieces of differing heights/uneven workpieces etc. the system of different spacers and spindles can be used to obtain a solid work surface as shown in FIGS. 35-36.

A further embodiment of the disclosure is shown in FIGS. 39-46. It can be used as a stand alone device or in combination with a spacer 18.

The add on cone element 200 is intended to support a workpiece with the minimum contact surface possible, which is typically desired for painting a workpiece but there are other uses.

Cone 200 has an apex 202 which rises above a base 204 by three sloping supports 206. The supports 206 may be free standing or supported by an underlying conical element 208. The shape of supports 206 may include aesthetic elements. Supports 206 may provide a degree of elasticity to the apex to absorb shock on the workpiece.

Surrounding the base element 204 are a plurality of flanges 210 preferably equally spaced around and of spring like materials so as to apply a bias force against the peripheral edge of the spacer 18. In this case the material is plastic and the flanges 210 apply a bias force by virtue of their connecting point with the base being of like material. The inside diameter of the flanges should be equal to or preferably less than the outer diameter of the spacer's peripheral edge, so that the cone will tend to snap on the spacer.

Figure 41:
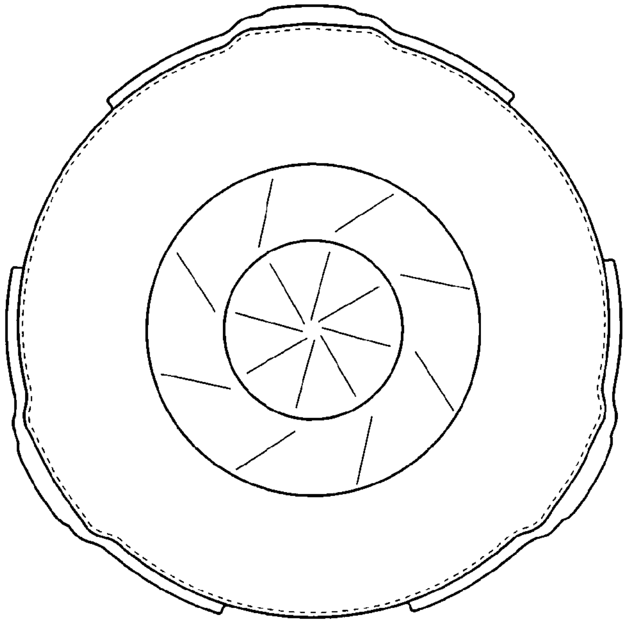
FIG. 41 of a bottom view of the cone of FIG. 39.
Figure 42:
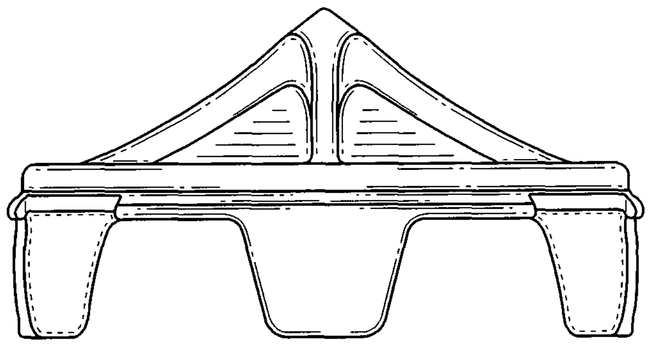
FIG. 42 is a side plan view of the cone of FIG. 39.
Figure 43:
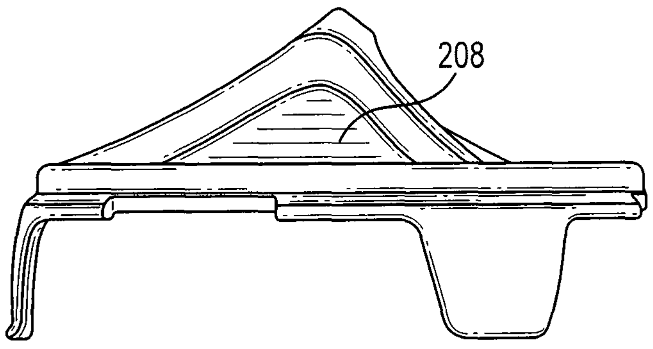
FIG. 43 is another side plan view of the cone of FIG. 39.

The bottom of the cone 200 as shown in FIG. 41 may be concave or flat.

Figure 44:
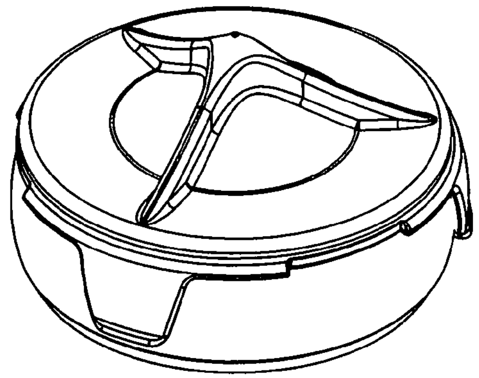
FIG. 44 is a perspective view of the cone atop a spacer.
Figure 45:
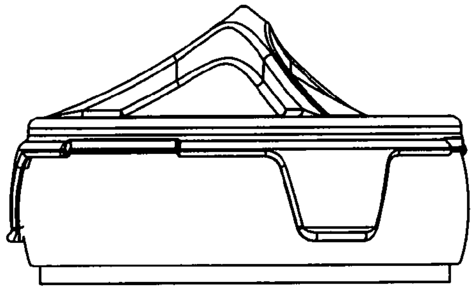
FIG. 45 is a side plan view of the subject in FIG. 44.
Figure 46:
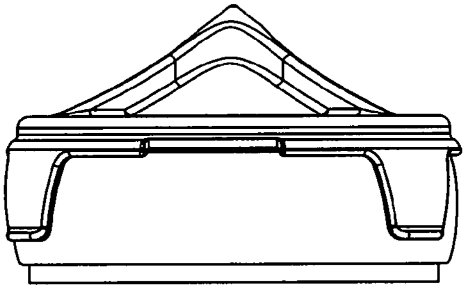
FIG. 46 is another side plan view of the subject in FIG. 44.

FIGS. 44-46 illustrate configurations where the cone is applied atop a spacer though it may be used alone. When used alone, it will not have as much structural support but will provide a more spring like support which may be advantageous in some cases.

It is also possible to provide a pointed threaded element, which screws into the threaded recess 100 in spacer 18. By providing a pointed element the spacer performs a similar function to the cone.

Although the non-slip spacers disclosed herein have been described with respect to several embodiments, workers skilled in the art will recognize that changes may be made in form and detail without departing from the spirit and scope of the non-slip spacer disclosure.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The invention claimed is:

1. A non-slip removable spacer system for holding a workpiece in place relative to a work surface when interposed therebetween, the system comprising:

a spacer element comprising:

a generally rigid core body having upper and lower generally planar surfaces with a peripheral edge to each of the upper and lower generally planar surfaces;

a gripping surface on each of the upper and lower generally planar surfaces; a recessed portion generally centrally located at at least one of the upper and lower generally planar surfaces, and a female attachment element in the recessed portion, and a linking member, having first and second spaced apart ends, each end including a threaded male attachment element sized to be received in the female attachment element.

2. The system of claim 1 wherein the female attachment element is threaded.

3. A non-slip removable spacer system for holding a workpiece in place relative to a work surface when interposed therebetween, the system comprising:

a spacer element comprising:

a generally rigid core body having upper and lower generally planar surfaces with a peripheral edge to each of the upper and lower generally planar surfaces:

a gripping surface on each of the upper and lower generally planar surfaces: a receased portion generally centrally located at at least on of the upper and lower generally planar surfaces, and a female attachment element in the recessed portion, and a linking number having first and second spacesd apart ends, each end including a male attachment element sized to be received in the female attachment element, wherein the linking member includes an elongated spindle with threaded male attachments at first and second ends and a shelf located between the first and second ends on the spindle, the shelf being generally orthogonal to the elongated spindle, wherein the shelf functions as a stop.

4. The system of claim 3 wherein the shelf is one of a plurality of shelves spaced along the spindle.

5. The system of claim 1 wherein the linking member is capable of engaging a pair of said spacer elements in direct contact.

6. The system of claim 5 wherein the linking member is a double ended threaded member.

7. The system of claim 6 wherein the linking member has right hand threads on one end and left hand threads on the other end.

8. A non-slip spacer system for holding a workpiece in place relative to a work surface when interposed therebetween, comprising:

at least one spacer body having a generally rigid core body having upper and lower generally planar surfaces with a peripheral edge to each of the upper and lower generally planar surfaces, and having a gripping surface on each of the upper and lower generally planar surfaces, the spacer body comprising:

a recessed portion generally centrally located at at least one of the upper and lower generally planar surfaces, and a female attachment element in the recessed portion; and a linking member, comprising:

first and second spaced apart ends, at least one of the first and second ends including a male attachment element sized to be received in the female attachment element; the linking member capable of connecting to the at least one spacer body, and a shelf interposed on a body of the linking member between the first and second ends, a portion of the shelf extending orthogonally from the body of the linking member and having an outer dimension greater than an outer dimension of the body of the linking member.

9. The system of claim 8 wherein the shelf is a planar flange.

10. The system of claim 8 wherein the linking member includes at least two shelves spaced between the ends of the member.

11. The system according to claim 8 wherein the linking member comprises two male attachment members joined end to end.

12. The system of claim 8 wherein the outer dimension of the body of the linking member is a diameter.

13. The system of claim 8 further comprising a cone configured for engagement with the at least one spacer body.

14. The system of claim 3 wherein the shelf is positioned closer to the first end than to the second end.

15. The system of claim 8 wherein the shelf is positioned closer to the first end than to the second end.

16. The system of claim 1 wherein the work surface comprises a second female attachment element configured to receive one of the male attachment elements.

17. The system of claim 8 wherein the work surface comprises a second female attachment element configured to receive one of the male attachment elements.

18. The system of claim 17 wherein the second female attachment element is further configured to receive at least a portion of the body of the linking member.

19. The system of claim 1 wherein a body of the linking member has an outer dimension greater than a dimension of the recessed portion at the at least one of the upper and lower generally planar surfaces.

20. The system of claim 8 wherein the outer dimension of the body of the linking member is greater than a dimension of the recessed portion at the at least one of the upper and lower generally planar surfaces.

* * * * *